UNITED STATES PATENT OFFICE.

CHARLES L. STEINROK, OF PITTSBURGH, PENNSYLVANIA, ASSIGNOR TO WESTINGHOUSE ELECTRIC & MANUFACTURING COMPANY, A CORPORATION OF PENNSYLVANIA.

MANUFACTURE OF TREATED STONE.

1,349,389.

Specification of Letters Patent. Patented Aug. 10, 1920.

No Drawing. Application filed December 4, 1916. Serial No. 134,894.

*To all whom it may concern:*

Be it known that I, CHARLES L. STEINROK, a citizen of the United States, and resident of Pittsburgh, in the county of Allegheny and State of Pennsylvania, have invented certain new and useful Improvements in the Manufacture of Treated Stone, of which the following is a specification.

My invention relates to the production of a material adapted for use as a substitute for the marble, slate, and similar materials heretofore used in making the non-conducting backing for switch-boards, tablet boards, switch bases, insulators, and similar electrical apparatus, and as stair treads and similar articles requiring superior wearing qualities.

One object of the invention is to treat natural stones such as Euclid blue stone or Berea grit, oolitic limestones, and similar natural stones found in large quantities in various parts of the United States, so as to make the treated material impervious to moisture and to impart to it high electrical resistance qualities much greater than are found in slate and equal to the best marble, the materials universally used for such purposes up to the present time.

Another object of the invention is to treat such stones so as to greatly add to the wearing qualities of the material when used for stair treads, floor tiles, paving, and similar purposes.

Another object of my invention is to treat such natural stone so as to make it of pleasing color without impairing its electrical resistance and moisture proof qualities.

A further object of this invention is to provide a novel method of treating stone having the combination of steps to be described in detail hereinafter and to be particularly pointed out in the appended method claim.

A still further object of the invention is the production of the new article of manufacture obtained in carrying out my novel method and forming the subject matter of part of the appended claim.

In carrying out my improved method a natural stone having the characteristics as to structure and composition of the sandstones known as Euclid blue stone or Berea grit, or oolitic limestones, is first cut to the desired outline and dimensions. The cut material is then gradually heated in a suitable furnace, or in other approved manner, to a temperature of from 212 to 400 degrees Fahrenheit, the material being maintained within such range of temperature for a time interval of from 2 to 6 hours so as to thereby drive off all moisture from the heated material.

When it is to be colored the material is then allowed to cool until at or slightly below a temperature of 250 degrees Fahrenheit and is then immersed in a heated solution of an anilin coloring material. Nigrosin, a black anilin coloring material has been found to be a desirable coloring material when a black color is to be imparted to the material.

The material is allowed to remain in the coloring solution, which is maintained at a temperature of about 212 degrees Fahrenheit, for sufficient time to cause the stone to absorb and become impregnated with the solution. After being removed from the solution the material is placed in a suitable furnace or oven, or is heated in any other desired manner, to such temperature and for such time interval as is necessary to drive off the solvent and thoroughly dry the material.

When dried the material is then immersed in a bath of melted paraffin which is heated above the melting point of paraffin (about 133 degrees Fahrenheit) and preferably to between 170 and 212 degrees Fahrenheit. It is desirable to not exceed 212 degrees Fahrenheit.

The material is kept in the bath of paraffin for sufficient time to cause the paraffin to penetrate throughout the porous stone or other material being treated, so that the so-treated stone will absorb paraffin until saturated therewith. Experiments have shown that a material such as Euclid blue stone having a thickness of one inch will become thoroughly saturated after from five to eight hours immersion in the heated paraffin, when the paraffin is maintained at a temperature of approximately 170 degrees Fahrenheit. In some cases, however, it will be necessary to maintain the material in the paraffin bath for from 24 to 48 hours. In all cases the porosity of the material and the temperature of the paraffin bath as well as the thickness of the material being treated, will be taken into consideration, the object being to cause the paraffin to penetrate throughout or saturate the material being treated. The amount of paraffin which is absorbed by the material is comparatively small, ordinarily being about 3 per cent. of the weight of the material treated.

After the material is removed from the paraffin bath it is permitted to cool in a dry atmosphere and the so-treated material will be found to be in readiness for the use to which it is to be put.

Tests show that the electrical resistance of the treated material forming my improved product will have been very materially increased, in some cases being tripled and in most cases being equal to marble, the material heretofore universally used in making switch-board backings and similar electrical apparatus used in high tension work.

Modifications in the composition of the solution of coloring material used and changes in the steps comprising my improved method may be made. The material may be treated before being cut to dimensions. The color imparted to the materials may be changed. A vacuum system may be employed in drying the materials and in impregnating the same, and other variations may be made without departing from my invention as defined in the appended claim.

I claim:—

That way of treating natural stone which comprises immersing the stone in a heated solution of anilin dye to thereby impregnate the stone with coloring material, heating the anilin-impregnated stone until freed of the solvent of the dye, and then immersing the dried stone in molten paraffin until saturated therewith, the molten paraffin being maintained at a temperature of 170 to 212 degrees Fahrenheit.

In testimony whereof I have hereunto set my hand.

CHARLES L. STEINROK.